United States Patent [19]

Chen

[11] 4,397,829
[45] Aug. 9, 1983

[54] PROCESS FOR TREATING CHLORINE-CONTAINING ORGANIC COMPOUNDS

[76] Inventor: Wu-Chi Chen, 859 Brittmoore Rd., Houston, Tex. 77079

[21] Appl. No.: 351,750

[22] Filed: Feb. 24, 1982

[51] Int. Cl.³ ............... C01B 31/26; C01B 7/01; C01B 17/02; C01G 1/04

[52] U.S. Cl. .................. 423/443; 423/481; 423/416; 423/573 R

[58] Field of Search ................. 423/443, 481

[56] References Cited

U.S. PATENT DOCUMENTS

| | | | |
|---|---|---|---|
| 2,616,793 | 11/1952 | Folkins et al. | 423/443 |
| 3,079,233 | 12/1963 | Wenzke | 423/443 |
| 3,240,564 | 3/1966 | Uffelmann | 423/443 |
| 4,094,961 | 6/1978 | Beavon | 423/443 |

OTHER PUBLICATIONS

Encyclopedia of Chem. Reac. by C. A. Jacobson vol. 2 p. 699 (1948).

*Primary Examiner*—Brian E. Hearn
*Assistant Examiner*—Steven Capella

[57] ABSTRACT

Chlorine-containing organic compounds are reacted with a sulfur-containing stream to produce hydrogen chloride, carbon disulfide, and/or hydrogen sulfide. Hydrogen chloride and carbon disulfide are recovered as products. Hydrogen sulfide is recovered as a product or converted into elemental sulfur for recycle using chlorine or oxygen-containing gas.

8 Claims, 1 Drawing Figure

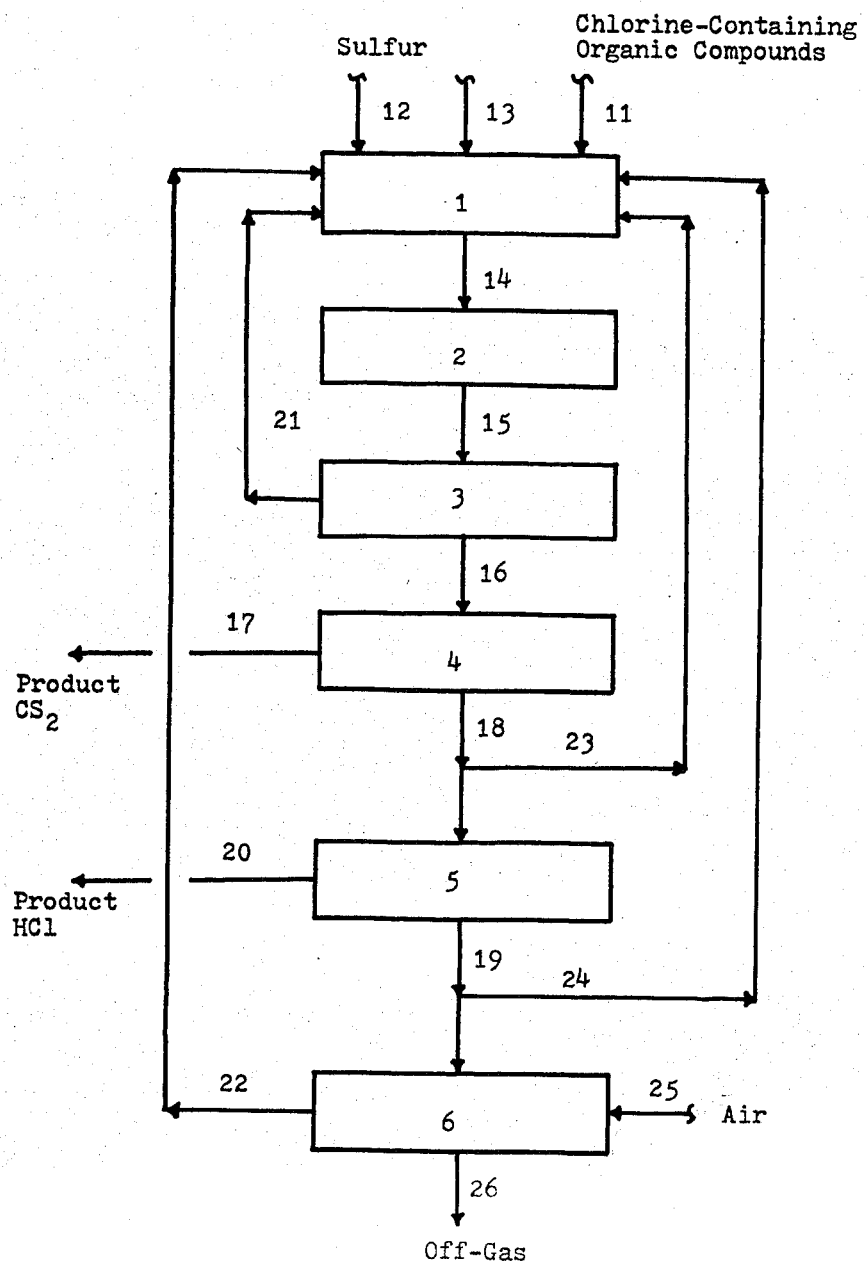

PROCESS FOR TREATING CHLORINE-CONTAINING ORGANIC COMPOUNDS

FIELD OF THE INVENTION

This invention relates to new and improved method for treating chlorine-containing organic compounds with a sulfur-containing stream to produce hydrogen chloride and carbon disulfide which are recovered as products. More specifically, this invention relates to the methods of treating chlorine-containing organic compounds with a sulfur-containing stream such as elemental sulfur or a mixture of elemental sulfur and hydrogen sulfide to obtain a product stream containing hydrogen chloride, carbon disulfide, and/or hydrogen sulfide. Hydrogen chloride in the product stream is recovered as anhydrous hydrogen chloride or hydrochloric acid. Carbon disulfide in the product stream is recovered as a product. Hydrogen sulfide is converted by chlorine or oxygen-containing gas into elemental sulfur for recycle.

BACKGROUND OF THE PRIOR ART

In the use and manufacture of chlorocarbons and chlorohydrocarbons, undesirable chlorine-containing organic compounds are usually produced. For examples, chlorinated liquid wastes are produced in the manufacture of vinyl chloride monomer (VCM). Chlorinated solid wastes are produced in the use and manufacture of polyvinyl chloride (PVC). Those organic wastes are considered as undesirable byproducts which do not have sufficient economic value for recovery. They also require proper disposal to minimize their impact on the environment.

Because of restrictive regulations on the disposal of those organic wastes by burial or impounding, various processes have been developed to burn those organic wastes and to recover their chlorine value as hydrogen chloride or hydrochloric acid. U.S. Pat. Nos. 3,453,073; 3,980,758; 4,059,675; and 4,151,262 disclosed processes for recovering hydrogen chloride by incinerating chlorinated organic wastes with air or with a mixture of air and steam. U.S. Pat. Nos. 3,933,989 and 3,969,490 disclosed processes for treating chlorinated solid wastes by pyrolysis to recover hydrogen chloride as a product and to obtain residual high molecular hydrocarbons which can be casted for disposal or be incinerated in a second stage operation.

Carbon disulfide is commercially made by reacting elemental sulfur with charcoal or methane. U.S. Pat. Nos. 2,568,121; 2,668,752; 2,709,639; 2,712,982; and 2,712,984 disclosed processes for producing carbon disulfide from natural gas using various catalysts. U.S. Pat. Nos. 2,882,130 and 3,087,788 disclosed non-catalytic processes for producing carbon disulfide. U.S. Pat. No. 3,079,233 disclosed a simplified method for recovering carbon disulfide from the product gas. U.S. Pat. No. 3,250,595 disclosed a process which operated at low pressure for carbon disulfide production and at high pressure for product separation and purification. In the production of carbon disulfide using natural gas as feedstock, a large facility is required for the conversion of byproduct hydrogen sulfide into elemental sulfur for recycle. U.S. Pat. Nos. 2,369,377; 2,474,067; 3,876,753; and 3,927,185 disclosed processes using olefins and higher hydrocarbons as feedstocks.

As described in details in this invention, I have found that hydrogen chloride can be recovered and carbon disulfide can be manufactured from chlorine-containing organic compounds. By reacting elemental sulfur with said organic compounds, hydrogen chloride and carbon disulfide can be produced and recovered as valuable products. This invention provides new and improved processes for the disposal of undesirable chlorine-containing organic wastes, and for the utilization of said organic wastes as feedstocks to produce hydrogen chloride and carbon disulfide.

SUMMARY OF THE INVENTION

According to this invention, there is provided a process for treating chlorine-containing organic compounds with elemental sulfur to recover chlorine value in the organic compounds as hydrogen chloride or hydrochloric acid, and to recover hydrocarbon value in the organic compounds as carbon disulfide and hydrogen sulfide. Hydrogen sulfide can be converted into elemental sulfur for recycle using chlorine or oxygen-containing gas as oxidation agent.

In one aspect of this invention, chlorine-containing organic compounds are reacted with elemental sulfur to obtain a product stream which contains hydrogen chloride, carbon disulfide, and hydrogen sulfide. The product stream is cooled to remove unreacted sulfur for recycle or disposal, to recover carbon disulfide as one product, and to obtain a gas stream which contains hydrogen chloride and hydrogen sulfide. The gas stream is scrubbed with hydrochloric acid to recover hydrogen chloride as another product and to obtain hydrogen sulfide for conversion to elemental sulfur for recycle.

In another aspect of this invention, chlorine-containing organic compounds which are rich in chlorine and lean in hydrogen are reacted with hydrogen sulfide or a mixture of hydrogen sulfide and elemental sulfur to produce hydrogen chloride and carbon disulfide which are recovered as products. Part of the recovered carbon disulfide is reacted with steam to produce hydrogen sulfide for recycle.

In another aspect of this invention, chlorine-containing organic compounds are reacted with elemental sulfur and steam to obtain a product stream which contains hydrogen chloride, carbon disulfide, carbonyl sulfide, and hydrogen sulfide. Hydrogen chloride and carbon disulfide are recovered as products. The resulting gas which contains carbonyl sulfide and hydrogen sulfide is reacted with oxygen-containing gas to recover elemental sulfur for recycle.

In another aspect of this invention, chlorine-containing organic compounds are reacted with elemental sulfur and chlorine or sulfur chlorides to produce hydrogen chloride and carbon disulfide which are subsequently recovered.

By following this invention, conventional methods using incineration for the disposal of chlorine-containing organic wastes, and using natural gas as feedstock for the production of carbon disulfide are all eliminated. As described in this invention, sulfur is used for the disposal of the organic wastes, and for the recovery of chlorine value as hydrogen chloride and carbon value as carbon disulfide. This invention provides a new and improved method for the utilization of undesirable chlorinated organic wastes, which need to be properly disposed of to minimize their impact on the environment, as feedstock for the production of carbon disulfide. This represents savings in conventional feedstocks such as natural gas or charcoal required for the manufacture of carbon disulfide.

Accordingly, it is an object of this invention to provide a new and improved method for the manufacture of hydrogen chloride and carbon disulfide from chlorine-containing organic compounds. It is another object to provide a new and improved method for the disposal of chlorine-containing organic wastes. It is another object to provide a new and improved method for the manufacture of carbon disulfide from chlorine-containing organic wastes.

Other aspects, advantages and objects of this invention will be apparent to those skilled in the art from this disclosure and the appended claims.

DETAILED DESCRIPTION OF THE INVENTION

The accompanying drawing shows diagrammatically one process within this invention. It is described in details to illustrate this invention.

Referring to the drawing, chlorine-containing organic compounds, and elemental sulfur are fed into zone 1 by way of pipes 11 and 12, respectively. Zone 1 is to preheat feed streams to as high temperature as desirable for downstream chemical reactions. However, it is preferred that the chlorine-containing organic compounds are preheated to below a temperature above which a significant amount of said organic compounds will be decomposed. If necessary, said organic compounds can be preheated to above their cracking temperature so that better heat balances in downstream chemical reactions can be achieved. It is preferred that elemental sulfur is preheated to high temperature such as between 550° C. and 700° C. in zone 1 so that sulfur is vaporized into sulfur vapor and sulfur vapor is largely dissociated into diatomic form. If necessary, steam, hydrogen sulfide or chlorine is fed into zone 1 by way of pipe 13. The feed streams are mixed and, with or without further heating, sent to zone 2 by way of pipe 14. Alternately, feed streams are preheated in zone 1 and send to zone 2 without mixing.

There are several variations in preheating the feed streams in zone 1. Sulfur vapor exists at its normal boiling point, 444.6° C., mainly as $S_8$. At higher temperature, $S_8$ decomposes into smaller molecular weight species such as $S_6$, $S_4$ and $S_2$. From the view point of unit operations, it is advantageous to maximize the endothermic dissociation of sulfur species in zone 1. This can be done by preheating sulfur to high temperature or preheating sulfur with diluent to reduce the partial pressure of sulfur vapor.

Zone 2 is a reactor which is operated at temperature between 250° C. and 1000° C. and pressure between 10 psia and 700 psia. Chlorine-containing organic compounds with an average composition represented by $C_xH_yCl_z$ are reacted to produce hydrogen chloride and carbon disulfide, in accordance with one of the following equations:

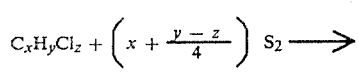

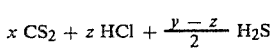

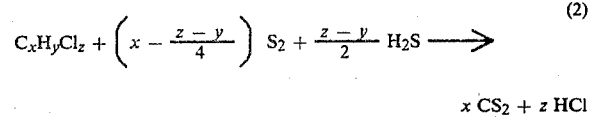

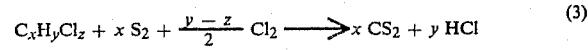

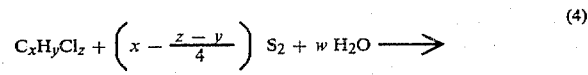

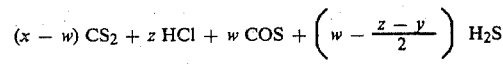

Equation 1 occurs when the chlorine-containing organic compounds in the feed contain more hydrogen atoms than chlorine atoms, i.e., y is greater than z. Methyl chloride, $CH_3Cl$, is an example. Equation 2 occurs when said organic compounds are rich in chlorine and lean in hydrogen, i.e., z is greater than y. Chloroform, $CHCl_3$, is an example. Equation 3 occurs when chlorine is used to produce hydrogen chloride. This reaction is important when only a small amount of chlorine is required to eliminate the production and treatment of hydrogen sulfide during the manufacture of carbon disulfide. Equation 4 occurs when steam is used to provide desirable heat balance or hydrogen balance. Equation 4 also occurs when said chlorine-containing organic compounds are contaminated with water.

Product gas from zone 2 is removed and fed into zone 3 by way of pipe 15. Because of the special characteristics of sulfur vapor, there are several variations in the operation of zone 2. One approach involves the use of several reactors in series with reheating the reactor effluents between the different stages of reaction. Another approach involves the use of high preheat temperature such as between 650° C. and 700° C. so that sulfur vapor is largely dissociated into diatomic form and temperature drop, if any, within the reactor will not be significant.

As compared with the conventional method for the disposal of chlorine-containing organic wastes by incineration, this invention provides a new and improved method for the recovery of hydrogen chloride as well as the manufacture of carbon disulfide by using sulfur instead of oxygen as a reagent. As compared with the conventional method for the production of carbon disulfide with methane as feedstock, this invention provides a new and improved method for the utilization of chlorine-containing organic wastes as feedstocks. For an organic waste with average composition represented by $C_{1.5}H_2Cl$, about 0.33 moles of hydrogen sulfide are generated per mole of carbon disulfide produced. With natural gas as the feedstock, about 2 moles of hydrogen sulfide are generated per mole of carbon disulfide produced.

Hydrogen sulfide generated in a commercial carbon disulfide plant is usually treated in a Claus unit to recover elemental sulfur for recycle. The utilization of chlorine-containing organic wastes as the feedstocks for the production of carbon disulfide represents not only the savings of natural gas which would otherwise be used, but also the reduction of the generation of hydrogen sulfur which need to be processed to recover elemental sulfur for recycle.

Zone 3 is to recover unreacted sulfur from the reaction product stream. This is done by cooling and phase separation. Entrained sulfur can be removed by scrubbing. It is preferred that the unreacted sulfur is recovered, filtered, and then recycled to zone 1 by way of pipe 21. If desired, the unreacted sulfur recovered from zone 3 is delivered to off-site or a Claus plant for disposal. The resulting gas from zone 3 contains carbon disulfide, hydrogen chloride, hydrogen sulfide and/or carbonyl sulfide. It is removed from zone 3 and delivered to zone 4 by way of pipe 16.

Zone 4 is for recovering carbon disulfide from the gaseous stream. The normal boiling point of carbon disulfide is 46.3° C. which is much higher than that of hydrogen chloride (−85° C.) or hydrogen sulfide (−59.6° C.). Carbon disulfide is recovered as a product by cooling and phase separation. If preferred, carbon disulfide can be separated from the gas stream in zone 4 by preferential absorption using a suitable mineral oil. $CS_2$-rich absorbent is stripped to obtain crude carbon disulfide which is then sent to a distillation unit where light and heavy ends are either purged or recycled and carbon disulfide is recovered. Carbon disulfide is removed from zone 4 as a product by way of pipe 17. The resulting gaseous stream which contains hydrogen chloride, hydrogen sulfide, and/or carbonyl sulfide is removed from zone 4 and fed into zone 5 by way of pipe 18. If desired, part of this gas is recycle to zone 1 by way of pipe 23. Part of the recovered carbon disulfide, if necessary, is reacted with steam at high temperature to produce hydrogen sulfide which is then recovered and sent to zone 1.

There are several variations for operating zones 3 and 4. In one version, reaction product gas from zone 2 is compressed before product separation and recovery in zones 3 and 4. In another version, the reaction product gas is cooled into two streams. One contains hydrogen chloride, hydrogen sulfide, and/or carbonyl sulfide which are sent to downstream for separation and recovery. The other contains unreacted sulfur and carbon disulfide which are then separated to recover unreacted sulfur for recycle and to obtain carbon disulfide as a product.

Zone 5 is to recover hydrogen chloride from the feed stream. Hydrogen chloride can be recovered by fractionation at high pressure and low temperature or by absorption and desorption. Using absorption and desorption, the gas stream from zone 4 is scrubbed with HCl-lean absorbent such as hydrochloric acid or water. The resulting HCl-rich absorbent is then stripped to obtain anhydrous hydrogen chloride and/or hydrochloric acid which are subsequently recovered as products. Hydrogen chloride and hydrochloric acid are removed from zone 5 by way of pipe 20. The resulting off-gas after HCl absorption contains mainly hydrogen sulfide, water vapor, and/or carbonyl sulfide. It is removed from zone 5 and delivered to zone 6 by way of pipe 19. If desired, part of this off-gas is recycled to zone 1 by way of pipe 24.

Zone 6 is to convert the feed stream which contains hydrogen sulfide and/or carbonyl sulfide into elemental sulfur for recycle or disposal. If a large amount of carbonyl sulfide is present in the feed gas, carbonyl sulfide is reacted with steam to produce hydrogen sulfide which is then converted into elemental sulfur for recycle. Conventional Claus plant can be used. Alternately, liquid phase oxidation using an oxygen-containing gas such as air can also be used. Air is fed into zone 6 by way of pipe 25. Product sulfur is removed from zone 6 and recycled to zone 1 by way of pipe 22. Off-gas from zone 6 is discharged to the atmosphere by way of pipe 26.

If desired, hydrogen sulfide can be reacted with a chlorine-containing stream such as chlorine, sulfur monochloride, or sulfur dichloride to produce elemental sulfur and hydrogen chloride. This eliminates the requirement of a conventional Claus unit needed for treating byproduct hydrogen sulfide.

The above detailed description shows a new and improved process within this invention for treating chlorine-containing organic compounds. The organic compounds are reacted with a sulfur-containing stream to produce hydrogen chloride and carbon disulfide which are subsequently recovered as products. This invention shows a new and improved process to utilize undesirable chlorine-containing organic wastes as feedstocks for the production of hydrogen chloride and carbon disulfide. By following this invention, natural gas and charcoal which are presently used as feedstocks for the production of carbon disulfide are preserved. By following this invention for the production of carbon disulfide, the amount of byproduct hydrogen sulfide generated is much smaller than that generated using natural gas as feedstock. This represents savings in the conversion of byproduct hydrogen sulfide into elemental sulfur for recycle.

The embodiments of this invention in which an exclusive property or privilege is claimed are defined as follows:

1. A process for the treatment of chlorinated hydrocarbons consisting essentially of
   (a) reacting said chlorinated hydrocarbons with a sulfur-containing stream which contains elemental sulfur and hydrogen sulfide in a reactor at temperature between 250° and 1000° C. and pressure between 10 and 700 psia. to obtain a product stream which contains carbon disulfide, hydrogen chloride, hydrogen sulfide, and unreacted sulfur; and
   (b) recovering said unreacted sulfur for recycle or disposal, recovering said carbon disulfide as one product, removing said hydrogen chloride for recovery or disposal, and removing said hydrogen sulfide for recycle, disposal, or conversion into elemental sulfur.

2. A process of claim 1 wherein said sulfur-containing stream contains elemental sulfur and chlorine or sulfur chlorides, and said hydrogen sulfide in the product stream is recovered and recycled to the reactor.

3. A process of claim 1 wherein a portion of said hydrogen sulfide in the product stream is reacted with chlorine or sulfur chlorides to obtain a resulting stream which contains elemental sulfur, hydrogen chloride, carbon disulfide, and hydrogen sulfide for subsequent product recovery.

4. A process of claim 1 wherein said sulfur-containing stream contains elemental sulfur and steam to obtain a reaction product stream which contains carbon disulfide, hydrogen chloride, hydrogen sulfide, carbonyl sulfide, and unreacted sulfur for subsequent product recovery.

5. A process of claim 1 wherein said chlorinated hydrocarbons contain hydrogen to chlorine molar ratio of greater than 1.0, and said sulfur-containing stream contains elemental sulfur.

6. A process of claim 1 wherein said chlorinated hydrocarbons containing equimolar proportions of hydrogen and chlorine are reacted with elemental sulfur at temperature between 250° and 600° C. to obtain a product stream which contains carbon disulfide, hydrogen chloride, and unreacted sulfur.

7. A process of claim 1 wherein said chlorinated hydrocarbons contain chloromethanes, chloroethanes, chloroethylenes, chlorinated paraffins, chlorinated benzenes, chlorinated toluenes, chlorinated naphthalenes, or chlorinated biphenyls.

8. A process of claim 1 wherein said chlorinated hydrocarbons are wastes from the production or use of the chlorine-containing organic compounds such as vinyl chloride monomer (VCM), polyvinyl chloride (PVC), mixture and copolymer of vinyl chloride, or pesticides.

* * * * *